US009155032B2

(12) United States Patent
Savolainen et al.

(10) Patent No.: US 9,155,032 B2
(45) Date of Patent: Oct. 6, 2015

(54) SYSTEM, METHOD, AND APPARATUS FOR DETERMINING A NETWORK INTERFACE PREFERENCE POLICY

(75) Inventors: Teemu Ilmari Savolainen, Nokia (FI); Gabor Bajko, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 13/700,619

(22) PCT Filed: May 28, 2010

(86) PCT No.: PCT/IB2010/052400
§ 371 (c)(1),
(2), (4) Date: Nov. 28, 2012

(87) PCT Pub. No.: WO2011/148234
PCT Pub. Date: Dec. 1, 2011

(65) Prior Publication Data
US 2013/0078985 A1    Mar. 28, 2013

(51) Int. Cl.
H04M 3/00      (2006.01)
H04W 48/18     (2009.01)
H04L 29/12     (2006.01)
H04W 8/26      (2009.01)
H04W 88/06     (2009.01)

(52) U.S. Cl.
CPC ......... *H04W 48/18* (2013.01); *H04L 29/12952* (2013.01); *H04L 29/12971* (2013.01); *H04L 61/6077* (2013.01); *H04L 61/6086* (2013.01); *H04W 8/26* (2013.01); *H04W 88/06* (2013.01)

(58) Field of Classification Search
CPC ....... H04W 48/20; H04W 48/18; H04W 8/26; H04L 61/6077; H04L 61/6086; H04L 29/12971
USPC ......... 370/312, 349, 389, 393, 397, 399, 409, 370/395.54; 455/418
See application file for complete search history.

(56) References Cited

U.S. PATENT DOCUMENTS

| 2005/0078633 | A1  | 4/2005 | Watanabe et al. |
| 2006/0028998 | A1* | 2/2006 | Lioy et al. ...................... 370/252 |
| 2007/0030855 | A1* | 2/2007 | Ribiere et al. ................ 370/401 |
| 2010/0083121 | A1  | 4/2010 | Famolari et al. |

(Continued)

FOREIGN PATENT DOCUMENTS

| CN | 101027889 A   | 8/2007 |
| WO | WO-2009/18359 A2 | 2/2009 |

OTHER PUBLICATIONS

International Search Report and Written Opinion for Application No. PCT/IB2010/052400; dated Feb. 1, 2011.

(Continued)

*Primary Examiner* — Khalid Shaheed
(74) *Attorney, Agent, or Firm* — Alston & Bird LLP

(57) ABSTRACT

A method and apparatus are provided for determining a network interface preference policy. An example method may include determining a network address family preference policy signaled to a host apparatus by an access point for a first network interface. The example method may additionally include selecting an interface from the first network interface and a second network interface for network traffic of the host apparatus based at least in part on the signaled preference policy. A corresponding apparatus is also provided.

12 Claims, 6 Drawing Sheets

(56) References Cited

U.S. PATENT DOCUMENTS

2010/0223363 A1* 9/2010 Sarikaya et al. ............. 709/220
2011/0038372 A1* 2/2011 Wijayanathan et al. ...... 370/389

OTHER PUBLICATIONS

Office Action from Chinese Patent Application No. 201080067860.7 dated Jan. 6, 2015.

* cited by examiner

SYSTEM, METHOD, AND APPARATUS FOR DETERMINING A NETWORK INTERFACE PREFERENCE POLICY

TECHNOLOGICAL FIELD

Embodiments of the present invention relate generally to communication technology and, more particularly, relate to a system, method, and apparatus for determining a network interface preference policy.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Some mobile network providers allow multi-mode communication devices to access mobile network services, including for example, voice calls, data transfer, Internet Protocol Multimedia Subsystem/Session Initiation Protocol (IMS/SIP) and/or similar services, over a plurality of network interfaces. For example, a dual-mode communication device may access network services over both a cellular network connection through a base station (for example, connected using cellular access) and over a wireless local area network (WLAN) connection through a WLAN access point (for example, connected through WLAN access). This dual mode capability, which allows dual mode capable communication devices to access mobile network services over a WLAN is sometimes referred to as Unlicensed Mobile Access (UMA) technology and in Third Generation Partnership Project (3GPP) standards is referred to as Generic Access Network (GAN) standards.

BRIEF SUMMARY OF SOME EXAMPLES OF THE INVENTION

Systems, methods, apparatuses, and computer program products are herein provided for determining a network interface preference policy. In this regard, systems, methods, apparatuses, and computer program products are provided that may provide several advantages to computing devices, computing device users, and network operators. Some example embodiments provide a network access point configured to signal a network address family preference policy to a host apparatus having a plurality of available network interfaces for connecting to a network. The network address family policy may indicate a level of preference for a first network address family that is by default generally preferred to a second network address family.

A host apparatus according to some example embodiments may be configured to select an interface from its available network interfaces as a preferred network interface based at least in part upon a network address family policy signaled to the host apparatus. In this regard, signaling a network address family preference policy indicating a level of preference below a predefined threshold level may enable a network operator to allow a host device to advantageously override a preference for a network address family and prefer an otherwise preferred network interface even if the preferred network address family is not available on the otherwise preferred network interface. Such embodiments may be particularly advantageous in scenarios wherein a second network interface that is otherwise preferred due to traffic burdens on an access network of another interface, relative network access costs, and/or the like would not otherwise be used because of lack of availability of a preferred network address family. Thus, in some example embodiments wherein a host apparatus is engaged in a data session over a cellular network interface supporting Internet Protocol version 6 (IPv6), which may be generally preferred to Internet Protocol version 4 (IPv4) and a wireless local area network (WLAN) interface is available that only offers support for IPv4, the host apparatus may be enabled to select a preference for engaging in data sessions over the WLAN interface in spite the lack of availability of IPv6 when an access point for the cellular network interface signals that a preference level for IPv6 is below a predefined threshold.

In this regard, some example embodiments may provide for intelligent prioritization of an IPv4 interface over an otherwise preferred IPv6 interface when certain conditions apply. Accordingly, a network operator of the cellular network may encourage hosts to offload cellular network traffic to an available WLAN access even if the WLAN does not support IPv6 and thus may benefit from reduced network load. Users may benefit from such offloading in scenarios wherein usage of the WLAN access is cheaper, such as due to data charges on the cellular network, offers potentially faster connectivity, and/or the like. Further, some example embodiments may enable intelligent offloading traffic from a cellular network interface even to a WLAN supporting only IPv4 using only a relatively small bit of policy information that may be signaled to a host device by an access point.

In some example embodiments, a method is provided, which comprises determining a network address family preference policy signaled to a host apparatus by an access point for a first network interface. The method of these example embodiments further comprises selecting an interface from the first network interface and a second network interface for network traffic of the host apparatus based at least in part on the signaled preference policy.

In other example embodiments, an apparatus is provided. The apparatus of these example embodiments comprises at least one processor and at least one memory storing computer program code, wherein the at least one memory and stored computer program code may be configured, with the at least one processor, to cause the apparatus to at least determine a network address family preference policy signaled to a host apparatus by an access point for a first network interface. The at least one memory and stored computer program code are configured, with the at least one processor, to further cause the apparatus of these example embodiments to select an interface from the first network interface and a second network interface for network traffic of the host apparatus based at least in part on the signaled preference policy.

In other example embodiments, a computer program product is provided. The computer program product of these example embodiments includes at least one computer-readable storage medium having computer-readable program instructions stored therein. The program instructions of these example embodiments comprise program instructions configured to determine a network address family preference policy signaled to a host apparatus by an access point for a first network interface. The program instructions of these example embodiments further comprise program instructions configured to select an interface from the first network interface and a second network interface for network traffic of the host apparatus based at least in part on the signaled preference policy.

In other example embodiments, an apparatus is provided that comprises means for determining a network address family preference policy signaled to a host apparatus by an access point for a first network interface. The apparatus of these example embodiments further comprises means for selecting an interface from the first network interface and a second network interface for network traffic of the host apparatus based at least in part on the signaled preference policy.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some examples of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
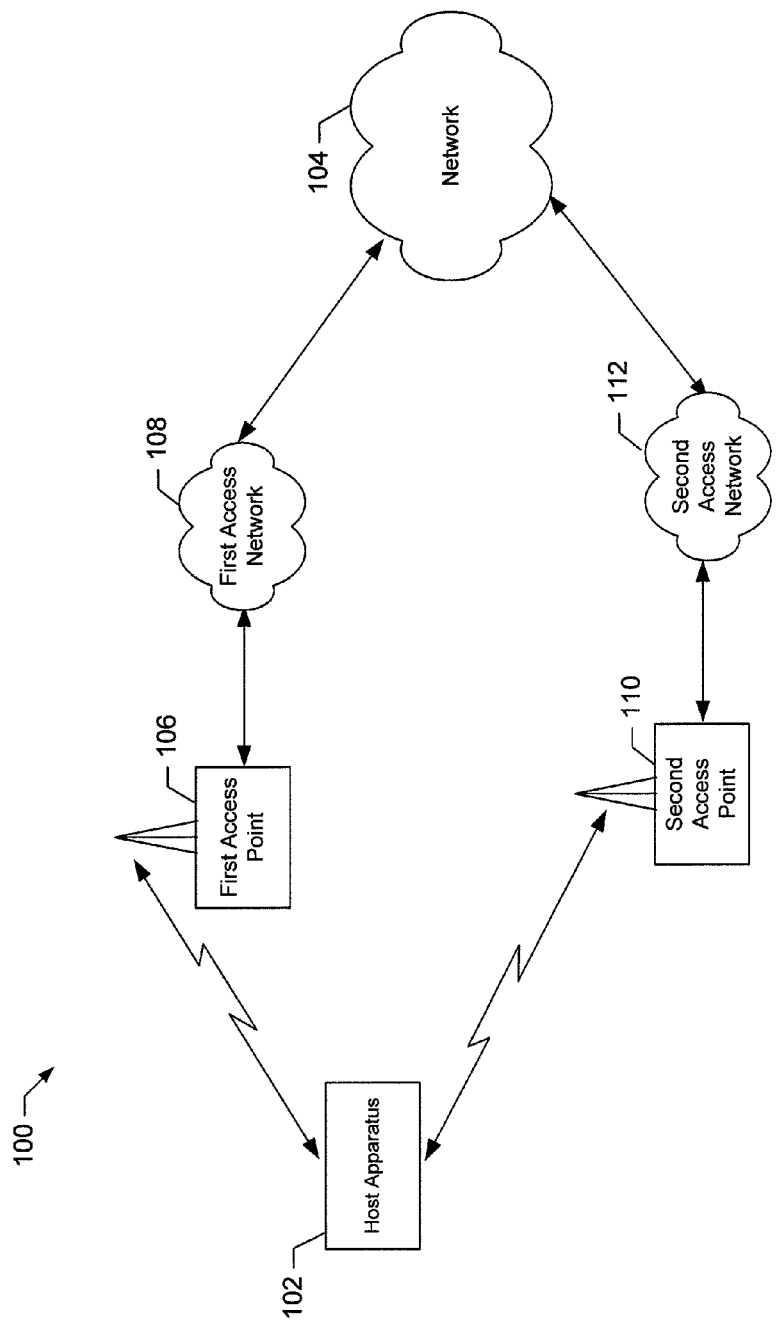
FIG. 1 illustrates a system for determining a network interface preference policy according to example embodiments of the invention.

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Cellular networks are often overloaded due to bandwidth intensive data transmitted over cellular networks in support of the operation of modern mobile communications devices. Accordingly, cellular network operators may benefit from offloading as much traffic as possible to wireless local area networks. In some instances, cellular network operators may benefit if only selected traffic, destined to services selected by a cellular network operator (such as IMS), is allowed be transmitted via cellular network. This selective preference is often called Selected IP Traffic Offloading (SIPTO). In addition to operator benefits from usage of local area networks, users of mobile communications devices may benefit from routing as much network traffic as possible via a local area network as opposed to a cellular network. In this regard, transmission of data via local area networks may be cheaper than transmission of data via cellular networks. Further, local area networks may offer faster connectivity with less latency than cellular networks. Additionally, usage of local area networks may require less power than usage of cellular networks and may thus reduce a rate of battery consumption by a mobile communications device.

Concurrent with increasing network data traffic burdens, deployment of IPv6 is increasing at a rapid pace and multihoming is becoming increasingly common. Currently hosts generally prefer IPv6 addresses over IPv4 addresses when creating transport connections, as recommended by RFC3484. Due to IPv6 deployments in cellular networks, hosts may increasingly encounter situations wherein they have dual-stack (IPv4 and IPv6) or IPv6 only cellular connection, but have an IPv4-only WLAN connection. In such a situation, when the host prefers IPv6 over IPv4 for new connections, the host will use the cellular interface for communications—even if WLAN should be preferred for offloading/policy reasons. In this regard, Table 1 lists what happens if a host having single cellular and WLAN connections active tries to communicate with a dual-stack peer, if IPv6 is always preferred over IPv4, and WLAN over cellular only as secondary decision logic. The address families (for example, IPv4 and/or IPv6) available on various example WLAN interface embodiments are listed across the first row and the address families available on various example cellular interface embodiments are listed down the first column.

TABLE 1

| WLAN AN AF Cellular AN AF | IPv4-only | IPv6-only | IPv4 and IPv6 |
| --- | --- | --- | --- |
| IPv4-only | WLAN used | WLAN used | WLAN used |

TABLE 1-continued

| WLAN AN AF Cellular AN AF | IPv4-only | IPv6-only | IPv4 and IPv6 |
|---|---|---|---|
| | (IPv4) | (IPv6) | (IPv6) |
| IPv6-only | Cellular used (IPv6) | WLAN used (IPv6) | WLAN used (IPv6) |
| IPv4 and IPv6 | Cellular used (IPv6) | WLAN used (IPv6) | WLAN used (IPv6) |

As illustrated in Table 1, by the bolded entries, a cellular network interface may be used in the event a WLAN is available that supports only IPv4 due to a default preference for IPv6. Accordingly, offloading requirements may not be fulfilled in current implementations wherein IPv6 is blindly preferred by default.

In contrast to Table 1, Table 2 illustrates a behavior in a case wherein preference for an otherwise preferred network address family (for example, IPv6) may be overridden so that a network interface (for example, a WLAN interface) may be preferred even if the otherwise preferred network address family is not available on the preferred network interface. Similarly to Table 1, the address families (for example, IPv4 and/or IPv6) available on various example WLAN interface embodiments are listed across the first row and the address families available on various example cellular interface embodiments are listed down the first column.

TABLE 2

| WLAN AN AF Cellular AN AF | IPv4-only | IPv6-only | IPv4 and IPv6 |
|---|---|---|---|
| IPv4-only | WLAN used (IPv4) | WLAN used (IPv6) | WLAN used (IPv6) |
| IPv6-only | WLAN used (IPv4) | WLAN used (IPv6) | WLAN used (IPv6) |
| IPv4 and IPv6 | WLAN used (IPv4) | WLAN used (IPv6) | WLAN used (IPv6) |

Accordingly, as illustrated in Table 2, if preference for a default address family may be overridden (for example, if address family selection may be made secondary to interface selection), a WLAN interface may be preferred to a cellular interface even if the WLAN does not offer support for an otherwise preferred address family (for example, IPv6). However, even given the potentially beneficial offloading illustrated in Table 2, the examples illustrated in Table 2 only provide how the decision making may be carried out if all applications and services engaged in data sessions support both IPv4 and IPv6. In this regard, in an instance in which a cellular network provisions a host with an IPv6 address only, and the host connects to an IPv4 only WLAN access network, the host may not be able to safely offload its IPv6 traffic to an IPv4 WLAN network. This may not be a problem as long as applications and services engaged in data sessions are dual-stack capable, as such applications and services may re-establish connection in WLAN access with IPv4. However, the host may not be able to determine in advance whether a particular application or service is dual-stack capable and thus able to survive handover to a different address family. As the IPv6 transition goes forward, it may be increasingly possible that the IPv6 cannot be offloaded to IPv4 access.

In addition to problems with the potential for loss of a data session due to lack of support for an address family by a particular service or application, offloading data from one network interface to another may be further complicated in an instance in which network traffic is configured with a particular route. In this regard, for example, if a data session active on a cellular interface is configured for a specific route over an IPv6 address and a WLAN interface is available, the data session should not be offloaded to the WLAN interface. This scenario is illustrated in Table 3, wherein the bottom two rows of the table show what should happen in a scenario wherein a data session is configured with a specific route via a cellular interface.

TABLE 3

| WLAN AN AF Cellular AN AF | IPv4-only | IPv6-only | IPv4 and IPv6 |
|---|---|---|---|
| IPv4-only | WLAN used (IPv4) | WLAN used (IPv6) | WLAN used (IPv6) |
| IPv6-only (with specific routes) | Cellular used (IPv6) | Cellular used (IPv6) | Cellular used (IPv6) |
| IPv4 and IPv6 (with specific routes) | Cellular used (IPv6) | Cellular used (IPv6) | Cellular used (IPv6) |

In this regard, it may be seen from Table 3 that the cellular interface continues to be preferred for those IPv6 connections configured for a specific route. IPv6 traffic that is not sent to addresses corresponding to a configured specific route may still be offloaded to the IPv4 WLAN interface as illustrated in Table 2.

Example embodiments described herein accordingly provide systems, methods, apparatuses, and computer program products for determining a network interface preference policy. Some example embodiments may facilitate offloading traffic from a first network interface to a second network interface even if the second network interface does not support a preferred network address family. Further, some example embodiments may facilitate such offloading without risking loss of a data session for an application or service using an address family that is not supported by the second access network.

Referring now to FIG. 1, FIG. 1 illustrates a block diagram of a system 100 for determining a network interface preference policy according to example embodiments of the present invention. It will be appreciated that the system 100 as well as the illustrations in other figures are each provided as example embodiments of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of a system for determining a network interface preference policy, numerous other configurations may also be used to implement embodiments of the present invention.

In some example embodiments, the system 100 includes a host apparatus 102 configured to access and engage in communication over a network 104 via an access point. The network 104 may comprise a wireline network, wireless network, a cellular network some combination thereof, or the like and in some example embodiments may comprise at least a portion of the interne. An access point may, for example, be configured to serve as a point of access to an access network through which the host apparatus 102 may communicate over the network 104. In this regard, an access point may, for example, comprise a base station, evolved node B (eNB), node B, gateway general packet radio service support node (GGSN), cellular access point, router, wireless router, or other access point configured to provide access to an access network to the host apparatus 102 through which the host apparatus 102 may communicate over the network 104. Accordingly, an access network may comprise a cellular access network, wireless local area network (WLAN), metropolitan area network (MAN), or other access network which a host apparatus 102 may access via an access point and through which the host apparatus 102 may engage in communication over the network 104.

The system 100 may comprise a plurality of access points and access networks. For purposes of example, a first access point 106 and respective corresponding first access network 108 as well as a second access point 110 and respective corresponding second access network 112 are illustrated. It will be appreciated, however, that the system 100 may comprise additional access points and respective corresponding access networks beyond those illustrated in FIG. 1. An access point and respective corresponding access network may implement any appropriate access protocol depending on the type of the access network. In this regard, the host apparatus 102 may comprise a communication interface as will be described further herein below which is configured to access a variety of available access points (for example, access points within radio communication range of the host apparatus 102 and/or which are otherwise reachable by the host apparatus 102) via respective network interfaces.

As an example, the host apparatus 102 may comprise a dual mode terminal configured to connect to the network 104 both through an unlicensed radio spectrum technology (for example, a WLAN) and through a cellular network (for example, a Third Generation (3G) cellular network, 3.9G cellular network, Long Term Evolution cellular network, and/or the like). In such an example, the first access point 106 may comprise a base station or other cellular network access point and the first access network 108 may comprise a cellular access network. The host apparatus 102 may be configured to establish a connection via the first access point 106 and communicate over the first access network 108 using a first network interface (for example, a cellular network interface). The second access point 110 may, for example, comprise a WLAN access point and the second access network 112 may comprise a WLAN. The host apparatus 102 may be configured to establish a connection via the second access point 110 and communicate over the second access network 112 using a second network interface (for example, a WLAN interface).

According to some example embodiments, the host apparatus 102 may be embodied as a desktop computer, laptop computer, mobile terminal, mobile computer, mobile phone, mobile communication device, tablet computer, game device, digital camera/camcorder, audio/video player, television device, radio receiver, digital video recorder, positioning device, any combination thereof, and/or the like. In some example embodiments, the host apparatus 102 may be embodied as a mobile terminal, such as that illustrated in FIG. 2.

Figure 2:
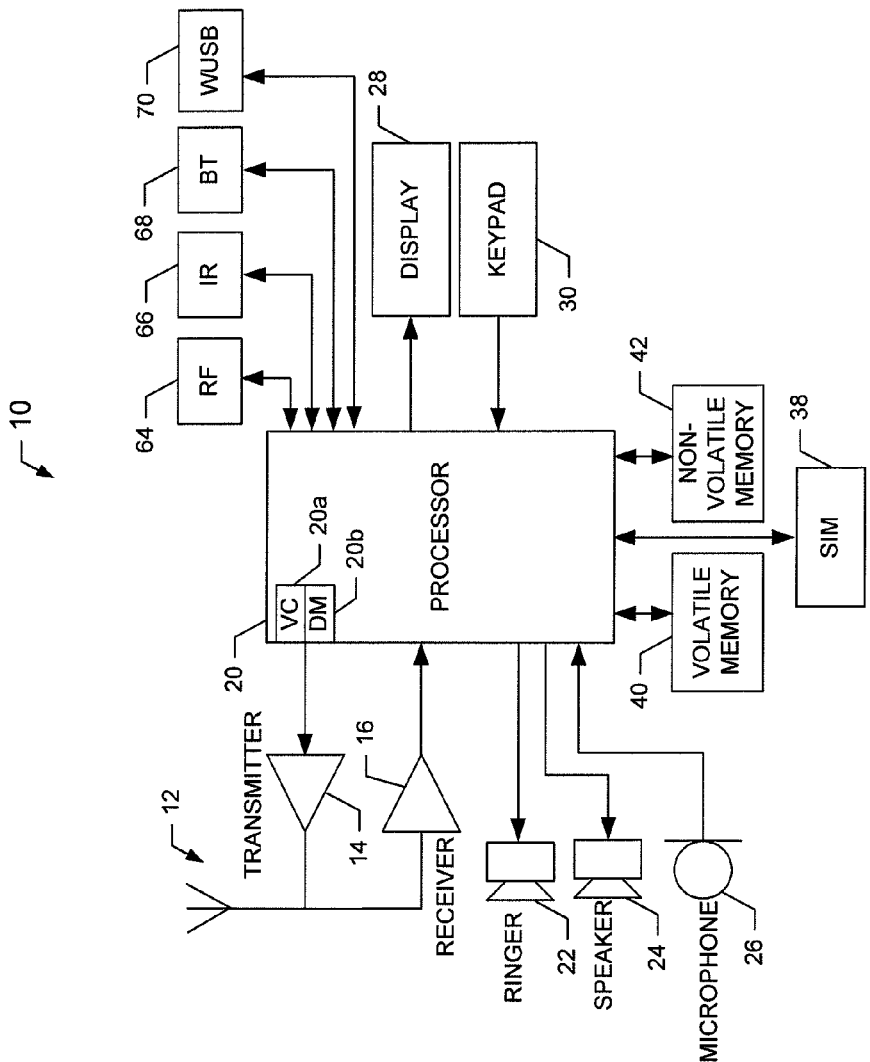
FIG. 2 is a schematic block diagram of a mobile terminal according to example embodiments of the invention.

In this regard, FIG. 2 illustrates a block diagram of a mobile terminal 10 representative of one embodiment of a host apparatus 102 in accordance with some example embodiments. It should be understood, however, that the mobile terminal 10 illustrated and hereinafter described is merely illustrative of one type of host apparatus 102 that may implement and/or benefit from disclosed embodiments and, therefore, should not be taken to limit the scope of the present invention. While several example embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

According to example embodiments, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wireless-Fidelity, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), H.323 and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In some example embodiments, a Narrow-band Advanced Mobile Phone System (NAMPS), as well as Total Access Communication System (TACS), mobile terminals may also benefit from embodiments of this invention, as may dual or higher mode phones (for example, digital/analog or TDMA/ CDMA/analog phones). Additionally, the mobile terminal 10 may be capable of operating according to Wireless Fidelity or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

According to some example embodiments, as shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wireless Fidelity, WLAN techniques such as IEEE 802.11 techniques, IEEE 802.15 techniques, IEEE 802.16 techniques, and/or the like.

According to some example embodiments, the mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
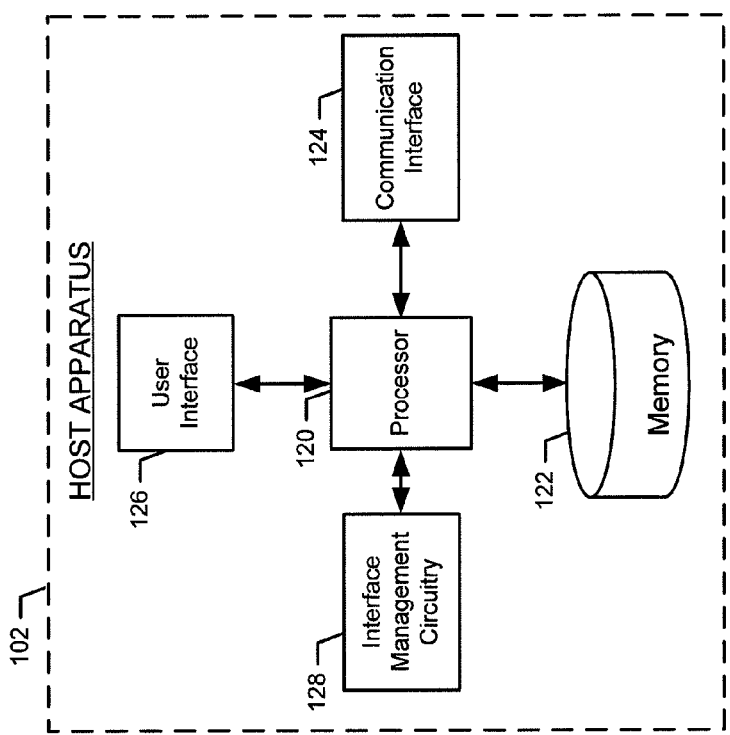
FIG. 3 illustrates a block diagram of a host apparatus according to example embodiments of the invention.

Referring now to FIG. 3, FIG. 3 illustrates a block diagram of a host apparatus 102 according to some example embodiments of the invention. According to some example embodiments, the host apparatus 102 may include various means, such as one or more of a processor 120, memory 122, communication interface 124, user interface 126, or interface management circuitry 128 for performing the various functions herein described. These means of the host apparatus 102 as described herein may be embodied as, for example, circuitry, hardware elements (for example, a suitably programmed processor, combinational logic circuit, and/or the like), a computer program product comprising a computer-readable medium (for example, memory 122) storing computer-readable program instructions (for example, software or firmware) that are executable by a suitably configured processing device (for example, the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some example embodiments the processor 120 may comprise a plurality of processors. The plurality of processors may be in operative communication with each other and may be collectively configured to perform one or more functionalities of the host apparatus 102 as described herein. In example embodiments wherein the host apparatus 102 is embodied as a mobile terminal 10, the processor 120 may be embodied as or comprise the processor 20. In some example embodiments, the processor 120 may be configured to execute instructions stored in the memory 122 or otherwise accessible to the processor 120. These instructions, when executed by the processor 120, may cause the host apparatus 102 to perform one or more of the functionalities of the host apparatus 102 as described herein. As such, whether configured by hardware or software methods, or by a combination thereof, the processor 120 may comprise an entity capable of performing operations according to example embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. Although illustrated in FIG. 3 as a single memory, the memory 122 may comprise a plurality of memories. In example embodiments, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In example embodiments wherein the host apparatus 102 is embodied as a mobile terminal 10, the memory 122 may comprise the volatile memory 40 and/or the non-volatile memory 42. The memory 122 may be configured to store information, data, applications, instructions, or the like for enabling the host apparatus 102 to carry out various functions in accordance with example embodiments of the present invention. For example, in some example embodiments, the memory 122 may be configured to buffer input data for processing by the processor 120. Additionally or alternatively, in some example embodiments, the memory 122 may be configured to store program instructions for execution by the processor 120. The memory 122 may store information in the form of static and/or dynamic information. This stored information may be stored and/or used by the interface management circuitry 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to an entity of the system 100. In this regard, the communication interface 124 may comprise and/or control a plurality of network interfaces (for example, cellular network interface, WLAN interface, some combination thereof, and/or the like). A respective network interface may be configured when available (for example, when the host apparatus 102 is in range of or is otherwise available to communicate with an access point for an access network implementing an access technology supported by the respective network interface) to establish a transport connection via the access point. In some example embodiments, the communication interface 124 may be at least partially embodied as or otherwise controlled by the processor 120. The communication interface 124 may, for example, be in communication with the processor 120, such as via a bus. The communication interface 124 may include, for example, an antenna, a transmitter, a receiver, a transceiver and/or supporting hardware or software for enabling communications with one or more entities of the system 100. The communication interface 124 may be configured to receive and/or transmit data using any protocol that may be used for communications between entities of the system 100. The communication interface 124 may additionally be in communication with the memory 122, user interface 126, and/or interface management circuitry 128, such as via a bus.

According to some example embodiments, the user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. The user interface 126 additionally may be in communication with the memory 122, communication interface 124, and/or interface management circuitry 128, such as via a bus.

According to example embodiments, the interface management circuitry 128 may be embodied as various means, such as circuitry, hardware, a computer program product comprising computer readable program instructions stored on a computer readable medium (for example, the memory 122) and executed by a processing device (for example, the processor 120), or some combination thereof and, in some example embodiments, may be embodied as or otherwise controlled by the processor 120. In example embodiments wherein the interface management circuitry 128 is embodied separately from the processor 120, the interface management circuitry 128 may be in communication with the processor 120. The interface management circuitry 128 may further be in communication with one or more of the memory 122, communication interface 124, or user interface 126, such as via a bus.

Figure 4:
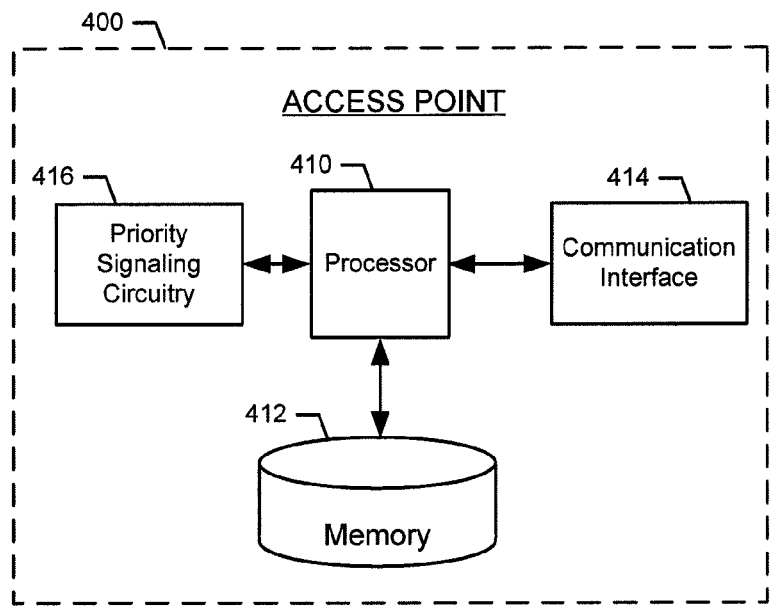
FIG. 4 illustrates a block diagram of an access point according to example embodiments of the invention.

Referring now to FIG. 4, FIG. 4 illustrates a block diagram of an access point 400 according to some example embodiments of the invention. The access point 400 may, for example, comprise an embodiment of the first access point 106 and/or second access point 110 as illustrated in FIG. 1. Accordingly, the access point 400 may comprise a base station, evolved node B (eNB), node B, gateway general packet radio service support node (GGSN), cellular access point, wireless router, router, some combination thereof, or the like. In this regard, the access point 400 may comprise any access point configured to provide access to an access network (for example, the first access network 108, second access network 112, or the like) to a host apparatus 102 via an appropriately configured network interface of the host apparatus 102. According to some example embodiments, the access point 400 may include various means, such as one or more of a processor 410, memory 412, communication interface 414, or priority signaling circuitry 416 for performing the various functions herein described. These means of the access point 400 as described herein may be embodied as, for example, circuitry, hardware elements (for example, a suitably programmed processor, combinational logic circuit, and/or the like), a computer program product comprising a computer-readable medium (for example, memory 412) storing computer-readable program instructions (for example, software or firmware) that are executable by a suitably configured processing device (for example, the processor 410), or some combination thereof.

The processor 410 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some example embodiments the processor 410 may comprise a plurality of processors. The plurality of processors may be in operative communication with each other and may be collectively configured to perform one or more functionalities of the access point 400 as described herein. In some example embodiments, the processor 410 may be configured to execute instructions stored in the memory 412 or otherwise accessible to the processor 410. These instructions, when executed by the processor 410, may cause the access point 400 to perform one or more of the functionalities of the access point 400 as described herein. As such, whether configured by hardware or software methods, or by a combination thereof, the processor 410 may comprise an entity capable of performing operations according to example embodiments of the present invention while configured accordingly. Thus, for example, when the processor 410 is embodied as an ASIC, FPGA or the like, the processor 410 may comprise specifically configured hardware for conducting one or more operations described herein. Alternatively, as another example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. Although illustrated in FIG. 4 as a single memory, the memory 412 may comprise a plurality of memories. In example embodiments, the memory 412 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 412 may be configured to store information, data, applications, instructions, or the like for enabling the access point 400 to carry out various functions in accordance with example embodiments of the present invention. For example, in some example embodiments, the memory 412 may be configured to buffer input data for processing by the processor 410. Additionally or alternatively, in some example embodiments, the memory 412 may be configured to store program instructions for execution by the processor 410. The memory 412 may store information in the form of static and/or dynamic information. This stored information may be stored and/or used by the priority signaling circuitry 416 during the course of performing its functionalities.

The communication interface 414 may be embodied as any device or means embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/ to an entity of the system 100. In some example embodiments, the communication interface 414 may be at least partially embodied as or otherwise controlled by the processor 410. The communication interface 414 may, for example, be in communication with the processor 410, such as via a bus.

The communication interface 414 may include, for example, an antenna, a transmitter, a receiver, a transceiver and/or supporting hardware or software for enabling communications with one or more entities of the system 100. The communication interface 414 may be configured to receive and/or transmit data using any protocol that may be used for communications between entities of the system 100. The communication interface 414 may additionally be in communication with the memory 412, and/or priority signaling circuitry 416, such as via a bus.

According to example embodiments, the priority signaling circuitry 416 may be embodied as various means, such as circuitry, hardware, a computer program product comprising computer readable program instructions stored on a computer readable medium (for example, the memory 412) and executed by a processing device (for example, the processor 410), or some combination thereof and, in some example embodiments, may be embodied as or otherwise controlled by the processor 410. In example embodiments wherein the priority signaling circuitry 416 is embodied separately from the processor 410, the priority signaling circuitry 416 may be in communication with the processor 410. The priority signaling circuitry 416 may further be in communication with one or more of the memory 412 or communication interface 414, such as via a bus.

In some example embodiments, the priority signaling circuitry 416 may be configured to signal a network address family preference policy to a host apparatus 102. The network address family preference policy may indicate a level of preference for a first network address family. The first network address family may, by default, be preferred over a second network address family. In this regard, the second address family may, for example, comprise a legacy network address family that is a predecessor to the first network address family. As one example, the first network address family may comprise Internet Protocol version 6 (IPv6) and the second network address family may comprise Internet Protocol version 4 (IPv4). It will be appreciated, however, that example embodiments described herein with reference to IPv4 and IPv6 wherein the network address family preference policy indicates a level of preference for IPv6 are provided merely for purposes of example. Accordingly, it will be appreciated that embodiments are not so limited and may be applied to any combination of network address families wherein one network address family is by default preferred over another network address family.

The network address family preference policy may, for example, be configured by a network operator responsible for operating an access point signaling the network address family preference policy. In this regard, the network address family preference policy may be configured to trigger whether and/or an extent to which a host apparatus 102 offloads network traffic to another network interface when available, as will be described further herein below.

The priority signaling circuitry 416 may be configured to broadcast a network address family preference policy over a respective access network or may signal the network address family preference policy specifically to the host apparatus 102. In some example embodiments, the priority signaling circuitry 416 may be configured to signal the network address family preference policy to a host apparatus 102 as a default router preference signaled in a router advertisement message. In this regard, the router advertisement message may comprise one or more bits (for example, the router advertisement message's "Prf" or preference bits) indicating a level of preference for a network address family.

In an example, wherein such a router advertisement message comprises two preference bits indicating a level of preference for a network address family, setting the preference bits to "11" in a router advertisement message signaled by an access point for a first network interface may indicate that the preference level for the first network address family is "low" (for example, a level of preference below a predefined threshold level) such that a host apparatus should prefer an otherwise preferred concurrently available second network interface higher than the first network address family of the first network interface, but not prefer (if available) a connection via the second network address family on the first network interface higher than a connection via the first network address family on the first network interface. Thus, using an example wherein the first network interface comprises a cellular network interface and the second network interface comprises a WLAN interface and wherein the first network address family comprises IPv6 and the second network address family comprises IPv4, a network operator may trigger a host apparatus 102 to override a default preference for IPv6 over IPv4 and to prefer an otherwise preferred WLAN interface to the cellular network interface even if support for IPv6 is not available on the WLAN interface (for example, if a WLAN access point and/or access network available using the WLAN interface does not support IPv6).

In contrast, in some example embodiments, if the preference bits are set to "01", the priority signaling circuitry 416 may indicate that the preference level for the first network address family is "high" (for example, a level of preference meeting a predefined threshold level). In this regard, when the level of preference is "high," the host apparatus 102 may be configured to prefer a connection using the first network address family (IPv6) of the less preferred first network interface (for example, a cellular network interface) to a connection over an otherwise preferred second network interface (for example, a WLAN interface) when support for the first network address family is not available on the second network interface. If, however, support for the first network address family were available on the second network interface, then the host apparatus 102 may be configured to prefer the second network interface over the first network interface in accordance with the default network interface preference policy. In this regard, a network operator may, for example, set the preference bits to indicate a high level of preference if the network operator values maintaining communications over the first network address family over offloading traffic.

In accordance with some example embodiments, setting the preference bits to "00" may signal a default level of preference, which may allow the host apparatus 102 to decide a level of preference in accordance with a hard coded or other predefined policy implemented by the host apparatus 102. Accordingly, the host apparatus 102 may consider a default level of preference as indicating a high level of preference (for example, a level of preference meeting a predefined threshold level) or as indicating a low level of preference (for example, a level of preference below a predefined threshold level) in accordance with a predefined preference policy implemented by the host apparatus.

It will be appreciated that the above examples of bit configurations are provided merely for purposes of example and other arrangements and valuations are contemplated within the scope of the disclosure. In addition to or in lieu of usage of a router advertisement message to signal a network address family preference policy, the priority signaling circuitry 416 may be configured in some example embodiments to indicate the network address family preference policy in a provisioning parameter signaled to the host apparatus 102. As another example, the priority signaling circuitry 416 may be configured to signal a network address family preference policy to a host apparatus 102 using a dedicated address selection policy distribution protocol.

In some example embodiments, the interface management circuitry 128 of a host apparatus 102 may be configured to receive an indication of a network address family preference policy signaled to the host apparatus 102 by an access point for a first network interface and to determine the signaled network address family preference policy. The interface management circuitry 128 may be further configured to select an interface from a plurality of available network interfaces (for example, the first network interface and a second network interface) as a preferred network interface based at least in part on the signaled preference policy. In this regard, the interface management circuitry 128 may be configured to select a preferred network interface for establishing a new data session. Additionally or alternatively, the interface management circuitry 128 may, in selecting a preferred network interface, be configured to select whether to offload network traffic from the first network interface to the second network interface.

In addition to basing a selection on a signaled network address family preference policy, the interface management circuitry 128 may be configured to select a preferred network interface between the first and second network interfaces (and/or any other network interfaces available in addition to the first network interface) based on a determined network address family support available on the second network interface (for example, whether the preferred first network address family is supported by an access point and/or access network reachable by the second network interface). In this regard, network address family support and thus a network address family may be available on a network interface if an access point and/or access network reachable using the network interface (for example, an access point and/or access network within range of the host device 104 and using the same access technology as the interface in question) offers support for the network address family.

Given an example wherein the second network interface is by default preferred over the first network interface and the network address family preference policy indicates a level of preference below a predefined threshold level (for example, the network address family preference policy comprises preference bits set to "11"), the interface management circuitry 128 may be configured to override preference for the first network address family and select the second network interface as a preferred network interface even if the first network address family is not available on the second network interface. It will be appreciated, however, that such a selection does not necessarily mean the interface management circuitry 128 will automatically offload any ongoing network traffic from the first network interface to the second network interface, as will be described further below with respect to several example embodiments.

If, however, the network address family preference policy indicates a level of preference meeting a predefined threshold level (for example, the network address family preference policy comprises preference bits set to "01") and the first network address family is not available on the second network interface, the interface management circuitry 128 may be configured to select the first network interface as preferred to the second network interface due to the high preference for the network address family that is not available on the second network interface.

In an instance in which the network address family policy indicates a default level of preference (for example, the network address family preference policy comprises preference bits set to "00"), the interface management circuitry 128 may be configured to evaluate the network address family preference policy in accordance with a default preference policy. In this regard, depending on the host apparatus's default preference policy, the interface management circuitry 128 may be configured to consider a default level of preference as being less than a predefined threshold level (for example, "low") or as meeting the predefined threshold level (for example, "high"). In an instance in which an access point for the first network interface does not signal an address family preference policy to the host apparatus 102, the interface management circuitry 128 may similarly be configured to select a network interface in accordance with a predefined default preference policy.

Having described example network interface selection in accordance with some example embodiments, several particular example embodiments will now be described with respect to specific context examples. For purposes of these examples, a cellular network interface will comprise a first network interface and a WLAN interface will comprise a second network interface. For purposes of the ensuing examples, the WLAN interface is, by default, preferred to the cellular network interface. It will be appreciated, however, that usage of a cellular network interface and a WLAN interface is merely for providing context to various example embodiments and not by way of limitation. In this regard, the example embodiments described in the ensuing examples further refer to IPv6 and IPv4, wherein usage of IPv6 is, by default, generally preferred to usage of IPv4. It will be appreciated, however, that usage of IPv6 and IPv4 is merely for purposes of example to provide context to various example embodiments and not by way of limitation. In this regard, the example embodiments described in the ensuing examples may be applied to any combination of a first network address family and a second network address family wherein the first network address family is, by default, preferred to the second network address family.

Table 4 illustrates a table according to some example embodiments wherein selection of a preferred network address family and preferred network interface is illustrated for various network address family preference policy levels. Various combinations of network address family support (for example, IPv6 and/or IPv4) available on the WLAN interface and a level of preference for IPv6 for the WLAN interface are illustrated across the top row of Table 4. Similarly, various combinations of network address family support (for example, IPv6 and/or IPv4) available on the cellular interface and a level of preference for IPv6 on the cellular interface are illustrated down the first column. Cells in the grid accordingly indicate (in bold) a preferred network address family and preferred network interface that may be selected by the interface management circuitry 128 in accordance with some example embodiments given the combination of network address family support available on the WLAN and cellular network interfaces and the levels of preference for IPv6.

TABLE 4

| WLAN IF<br>Cellular IF | IPv6 only<br>6prf: low | IPv6 only<br>6prf:<br>default | IPv6 only<br>6prf: high | IPv4 only | Dual-Stack<br>6prf: low | Dual-Stack<br>6prf:<br>default | Dual-Stack<br>6prf: high |
|---|---|---|---|---|---|---|---|
| IPv4 only | IPv4: 3G<br>IPv6:<br>WLAN | IPv4: 3G<br>IPv6:<br>WLAN | IPv4: 3G<br>IPv6:<br>WLAN | IPv4:<br>WLAN<br>IPv6:<br>N/A | IPv4:<br>WLAN<br>IPv6:<br>WLAN | IPv4:<br>WLAN<br>IPv6:<br>WLAN | IPv4:<br>WLAN<br>IPv6:<br>WLAN |
| IPv6 only<br>6prf: low | IPv4:<br>N/A<br>IPv6:<br>WLAN | IPv4:<br>N/A<br>IPv6:<br>WLAN | IPv4:<br>N/A<br>IPv6:<br>WLAN | IPv4:<br>WLAN<br>IPv6: 3G | IPv4:<br>WLAN<br>IPv6:<br>WLAN | IPv4:<br>WLAN<br>IPv6:<br>WLAN | IPv4:<br>WLAN<br>IPv6:<br>WLAN |
| IPv6 only<br>6prf:<br>default | IPv4:<br>N/A<br>IPv6: 3G | IPv4:<br>N/A<br>IPv6:<br>WLAN | IPv4:<br>N/A<br>IPv6:<br>WLAN | IPv4:<br>WLAN<br>IPv6: 3G | IPv4:<br>WLAN<br>IPv6: 3G | IPv4:<br>WLAN<br>IPv6:<br>WLAN | IPv4:<br>WLAN<br>IPv6:<br>WLAN |
| IPv6 only<br>6prf: high | IPv4:<br>N/A<br>IPv6: 3G | IPv4:<br>N/A<br>IPv6: 3G | IPv4:<br>N/A<br>IPv6:<br>WLAN | IPv4:<br>WLAN<br>IPv6: 3G | IPv4:<br>WLAN<br>IPv6: 3G | IPv4:<br>WLAN<br>IPv6: 3G | IPv4:<br>WLAN<br>IPv6:<br>WLAN |
| Dual-Stack<br>6prf: low | IPv4: 3G<br>IPv6:<br>WLAN | IPv4: 3G<br>IPv6:<br>WLAN | IPv4: 3G<br>IPv6:<br>WLAN | IPv4:<br>WLAN<br>IPv6: 3G | IPv4:<br>WLAN<br>IPv6:<br>WLAN | IPv4:<br>WLAN<br>IPv6:<br>WLAN | IPv4:<br>WLAN<br>IPv6:<br>WLAN |
| Dual-Stack<br>6prf:<br>default | IPv4: 3G<br>IPv6: 3G | IPv4: 3G<br>IPv6:<br>WLAN | IPv4: 3G<br>IPv6:<br>WLAN | IPv4:<br>WLAN<br>IPv6: 3G | IPv4:<br>WLAN<br>IPv6: 3G | IPv4:<br>WLAN<br>IPv6:<br>WLAN | IPv4:<br>WLAN<br>IPv6:<br>WLAN |
| Dual-Stack<br>6prf: high | IPv4: 3G<br>IPv6: 3G | IPv4: 3G<br>IPv6: 3G | IPv4: 3G<br>IPv6:<br>WLAN | IPv4:<br>WLAN<br>IPv6: 3G | IPv4:<br>WLAN<br>IPv6: 3G | IPv4:<br>WLAN<br>IPv6: 3G | IPv4:<br>WLAN<br>IPv6:<br>WLAN | embodiments and not by way of limitation. In this regard, the example embodiments described in the ensuing examples may be applied to any combination of a first and second network interface wherein a second network interface is, by default, preferred to the first network interface. The ensuing examples further refer to IPv6 and IPv4, wherein usage of IPv6 is, by default, generally preferred to usage of IPv4. It In some example embodiments, as illustrated in Table 4, a default network address family preference level is treated as a "high" level of preference (for example, a level of preference meeting a predefined threshold level. As illustrated, for IPv4 a WLAN interface may always be preferred if available. Two cells are highlighted to illustrate where some example embodiments may make an improvement over a previous arrangement wherein network address family preference is always valued over network interface preference. In this regard, the two highlighted cells indicate instances in which only IPv4 is available on the WLAN interface but IPv4 over the WLAN interface may be selected as the preferred network address family and network interface combination anyway because the network address preference level for IPv6 signaled by the cellular network access point is "low" (for example, a level of preference below a predefined threshold level). Accordingly, in these instances, a cellular network operator may utilize the low network address preference level to trigger new data sessions to be established via the WLAN interface and/or to trigger the IPv6 traffic over the cellular network interface to be offloaded to the IPv4 over the WLAN interface.

Further, in the embodiments indicated in Table 4, access points for both the WLAN interface and the cellular network interface signal a level of preference for IPv6. In this regard, by some example embodiments, the interface management circuitry 128 may be configured to determine a first network address family preference policy signaled by an access point for a first network interface and determine a second network address family preference policy signaled by an access point for a second network interface. The interface management circuitry 128 may be further configured to follow and/or compromise between both the first and the second network address family preference policy. In this regard, the interface management circuitry 128 may be configured to select a preferred network interface based on a plurality of network address family preference policies signaled to the host apparatus 102.

In this regard, such as in the example embodiments illustrated in Table 4, the interface management circuitry 128 may be configured to select a preferred network interface based on a plurality of network address family preference polices in such a way that if both interfaces are communicating the address family preference policy, then the interface management circuitry 128 may use the interface preference as the tie breaker (for example, selects WLAN instead of cellular if both claim same preference). However, in some alternative embodiments, an interface to which a user of the host apparatus 102 subscribes (for example, a user may subscribe to a cellular network accessible via a cellular interface) may be the preferred in case high preference is received. In this regard, a host and/or network operator may prefer that traffic for a higher priority address family defaults to the interface providing service to which the user of the host apparatus 102 subscribes.

It will be appreciated that Table 4 is not reflective of all embodiments. In this regard, other network interface types and network address families may be substituted for those used in the example of Table 4. Further, in other example embodiments, the cellular network interface may, by default, be preferred to the WLAN interface and/or IPv4 may, by default, be preferred to IPv6. Additionally, the results set forth in the example of Table 4 would be different in an instance in which the interface management circuitry 128 were to treat the "default" level of preference for IPv6 as "low" rather than as "high."

In some example embodiments, the interface management circuitry 128 may be configured in an instance in which network traffic is being transferred via IPv6 over a cellular network interface and a connection to a higher priority network interface (for example, a WLAN interface) becomes available to determine whether IPv6 is available on the higher priority network interface. It will be appreciated that this determination may be made prior to selection of a preferred network interface based on a network address family preference policy. In this regard, the interface management circuitry 128 may be configured to determine whether to prefer the WLAN interface to the cellular interface based at least in part on whether IPv6 is available on the WLAN interface (for example, whether a WLAN accessible by the WLAN interface supports IPv6) in addition to a network address family preference policy. Accordingly, in some example embodiments, the interface management circuitry 128 may be configured to select a WLAN interface or other interface as preferred over an active interface only if at least some traffic (for example, IPv6 traffic) may be offloaded from the active interface to the WLAN interface. In example embodiments wherein availability of IPv6 (or other address family) is determined prior to interface selection, the previously determined address family availability may be used to support network traffic offloading decisions.

The interface management circuitry 128 may be configured to determine whether IPv6 (and/or other address family) is available on the WLAN interface by using a link layer procedure to query whether IPv6 is supported on the higher priority network interface. For example, where the higher priority network interface comprises a WLAN interface, the interface management circuitry 128 may be configured to query the IP address version capability (for example, using an IEEE 802.11u parameter) of the WLAN interface. In this regard, the interface management circuitry 128 may use a defined network address family support query parameter to query an access point for the WLAN to determine whether IPv6 is available on the WLAN interface.

The interface management circuitry 128 may be configured to determine whether to offload traffic from a transport connection on the cellular network interface using IPv6 to the WLAN interface based at least in part on whether IPv6 is available on the WLAN interface. In an instance in which IPv6 is available on the WLAN interface, the interface management circuitry 128 may be configured to offload the traffic to the WLAN interface. In this regard, the interface management circuitry 128 may be configured to determine whether to offload traffic from a first network interface to a second network interface selected as a preferred network interface, such as based on a signaled address family preference policy. Alternatively, the interface management circuitry 128 may be configured to select a second network interface as a preferred network interface only if traffic may be offloaded from a first network interface (for example a cellular network interface) to the second network interface (for example, a WLAN interface).

In an instance in which the available WLAN interface does not offer support for IPv6, the interface management circuitry 128 may be configured to determine whether an address transition mechanism for transitioning between IPv6 and IPv4 is supported or otherwise available in the host apparatus 102 or in particular on the WLAN interface. This determination may be made prior to selecting a preferred network interface and may be used by the interface management circuitry 128 as a basis for selection of a preferred network interface. Alternatively, this determination may be made strictly in support of an offloading decision subsequent to selection of the WLAN interface as a preferred interface. Such an address transition mechanism may, for example, comprise Teredo, 6to4, Dual-Stack Mobile IPv6 (DSMIP6), a virtual private network (VPN), Intra-Site Automatic Tunnel Addressing Protocol (ISATAP), a configured tunnel, and/or the like. In an instance in which an address transition mechanism is available on the WLAN interface, the interface management circuitry 128 may be configured to select the WLAN for association and/or to offload IPv6 network traffic from the cellular network interface to the WLAN interface using the address transition mechanism. However, in an instance in which an address transition mechanism is not available on the WLAN interface, the interface management circuitry 128 may be configured to maintain the transport connection using IPv6 on the cellular network interface. The interface management circuitry 128 may, however, select the WLAN interface as a preferred interface for establishing new data sessions via IPv4.

In example embodiments wherein the host apparatus 102 is not configured to support simultaneous data connections over multiple interfaces (for example, over both the cellular network interface and the WLAN interface), the interface management circuitry 128 may be configured to not switch from the cellular to WLAN interface unless it is determined that IPv6 and/or an address transition mechanism for transitioning between IPv6 and IPv4 is available on the WLAN interface. The determination whether IPv6 is available on the WLAN interface can be made without impact on the ongoing data session on the other active interface.

In some example embodiments, the interface management circuitry 128 may be configured to determine whether network traffic being transmitted over a transport connection on a first network interface is configured for a specific route. In an instance in which the network traffic is configured for a specific route, the interface management circuitry 128 may be configured to not offload the network traffic to a second network interface even if the second network interface has been selected as a preferred network interface, such as due to a default policy, a signaled network address family preference policy, and/or the like.

Figure 5:
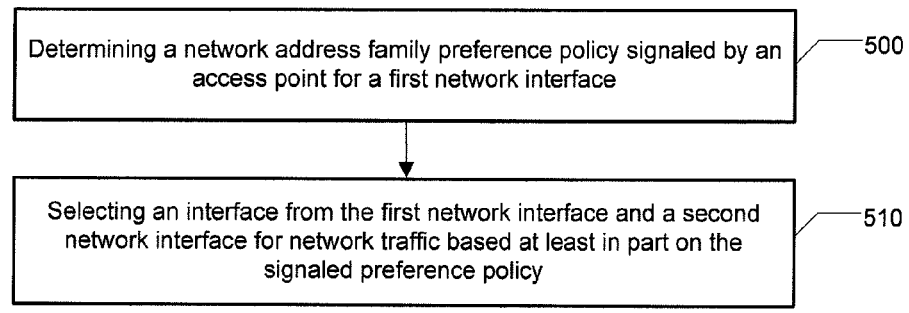
FIG. 5 illustrates a flowchart according to example methods for determining a network interface preference policy according to example embodiments of the invention.

FIG. 5 illustrates a flowchart according to example methods for determining a network interface preference policy according to example embodiments of the invention. In this regard, FIG. 5 illustrates operations that may, for example, be performed at the host apparatus 102. The operations illustrated in and described with respect to FIG. 5 may, for example, be performed by, under control of, and/or with the assistance of one or more of the processor 120, memory 122, communication interface 124, user interface 126, or interface management circuitry 128. Operation 500 may comprise determining a network address family preference policy signaled to a host apparatus by an access point for a first network interface. Operation 510 may comprise selecting an interface from the first network interface and a second network interface for network traffic based at least in part on the signaled preference policy.

Figure 6:
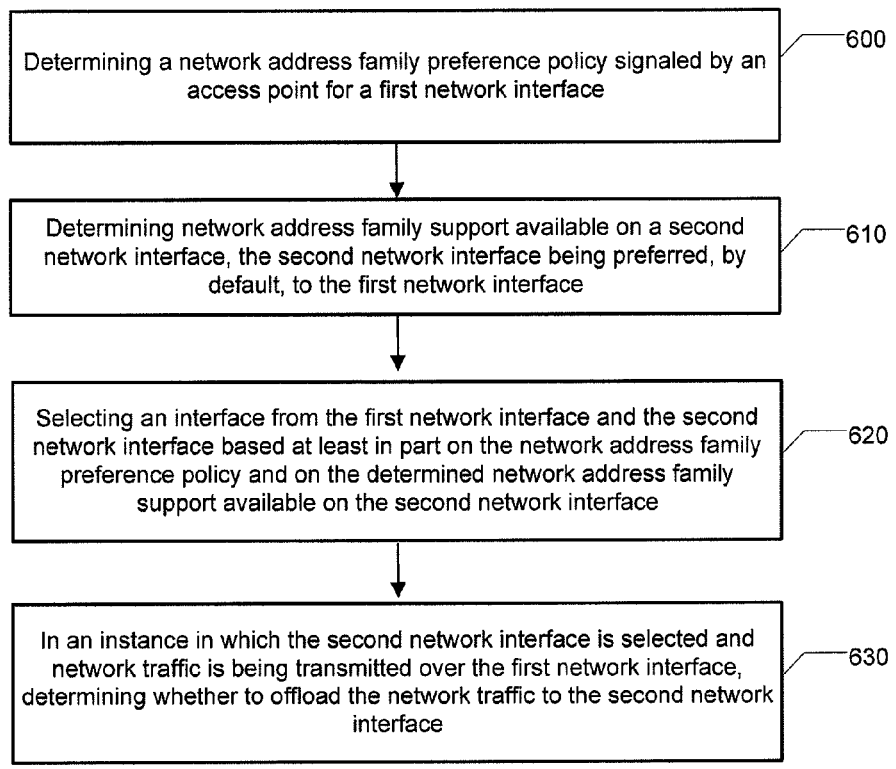
FIG. 6 illustrates a flowchart according to example methods for determining a network interface preference policy according to example embodiments of the invention.

FIG. 6 illustrates a flowchart according to example methods for determining a network interface preference policy according to example embodiments of the invention. In this regard, FIG. 6 illustrates operations that may, for example, be performed at the host apparatus 102. The operations illustrated in and described with respect to FIG. 6 may, for example, be performed by, under control of, and/or with the assistance of one or more of the processor 120, memory 122, communication interface 124, user interface 126, or interface management circuitry 128. Operation 600 may comprise determining a network address family preference policy signaled by an access point for a first network interface. Operation 610 may comprise determining network address family support available on a second network interface. The second network interface may be preferred, by default, to the first network interface. Operation 620 may comprise selecting an interface from the first network interface and the second network interface based at least in part on the network address family preference policy and on the determined network address family support available on the second network interface. In an example instance in which the network address family preference policy indicates a level of preference for a first network address family that is below a predefined threshold level and the first network address family is not available on the second network interface, operation 620 may comprise selecting the second network interface. In an alternative example instance in which the network address family preference policy indicates a level of preference for the first network address family that meets a predefined threshold level and the first network address family is not available on the second network interface, operation 620 may comprise selecting the first network interface.

The example methods illustrated in FIG. 6 may optionally further comprise an operation 630 in an instance in which the second network interface is selected in operation 620 and network traffic is being transmitted over the first network interface. In this regard, operation 630 may optionally comprise determining whether to offload the network traffic from the first network interface to the second network interface. This determination may be based on whether a network address family used for transmission of the network traffic is available on the second network interface, whether an address transition mechanism for transitioning between network address families is available on the second network interface, whether the network traffic is configured to use a specific route, some combination thereof, or the like. Alternatively, in some example embodiments, the second network interface may be selected in operation 620 only if at least some network traffic may be offloaded from the first network interface to the second network interface. Accordingly, factors such as whether a network address family used for transmission of the network traffic is available on the second network interface, whether an address transition mechanism for transitioning between network address families is available on the second network interface, whether the network traffic is configured to use a specific route, some combination thereof, or the like may be determined and used as a basis for making the selection of operation 620 in some example embodiments.

FIGS. 5-6 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (for example, memory 122) on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, the host apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In some example embodiments, a suitably configured processor (for example, the processor 120) may provide all or a portion of the elements. In other example embodiments, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining, at a host apparatus, a network address family preference policy signaled by an access point for a first network interface, wherein the network address family preference policy signaled to the host apparatus by the access point comprises a default router preference signaled in a router advertisement message signaled to the host apparatus by the access point, wherein the network address family preference policy indicates a level of preference for a first network address family, wherein the first network address family is by default preferred over a second network address family; and
   selecting an interface from the first network interface and a second network interface for network traffic of the host apparatus based at least in part on the signaled preference policy,
   wherein the second network interface is by default preferred over the first network interface, and wherein in an instance in which the network address family preference policy indicates a level of preference below a predefined threshold level and the first network address family is not available on the second network interface, preference for the first network address family is overridden and selecting a network interface comprises selecting the second network interface.

2. A method comprising:
   determining, at a host apparatus, a network address family preference policy signaled by an access point for a first network interface, wherein the network address family preference policy signaled to the host apparatus by the access point comprises a default router preference signaled in a router advertisement message signaled to the host apparatus by the access point; and
   selecting an interface from the first network interface and a second network interface for network traffic of the host apparatus based at least in part on the signaled preference policy,
   wherein in an instance in which network traffic is being transmitted over a transport connection on the first network interface and the second network interface is selected, further comprising:
   determining whether the network traffic being transmitted over the transport connection is configured for a specific route; and
   in an instance in which the network traffic being transmitted over the transport connection is determined to be configured for a specific route, determining to not offload the network traffic being transmitted over the transport connection to the second network interface.

3. The method of claim 1, wherein selecting an interface for network traffic comprises selecting whether to offload network traffic from the first network interface to the second network interface.

4. The method of claim 1, wherein the first network interface comprises a cellular network interface and the second network interface comprises a wireless local area network interface.

5. An apparatus comprising at least one processor and at least one memory storing computer program code, wherein the at least one memory and stored computer program code are configured, with the at least one processor, to cause the apparatus to at least:
   determine a network address family preference policy signaled by an access point for a first network interface, wherein the network address family preference policy signaled to the host apparatus by the access point comprises a default router preference signaled in a router advertisement message signaled to the host apparatus by the access point, wherein the network address family preference policy indicates a level of preference for a first network address family, and wherein the first network address family is by default preferred over a second network address family; and
   select an interface from the first network interface and a second network interface for network traffic based at least in part on the signaled preference policy,
   wherein the second network interface is by default preferred over the first network interface, and wherein in an instance in which the network address family preference policy indicates a level of preference below a predefined threshold level and the first network address family is not available on the second network interface, preference for the first network address family is overridden and the at least one memory and stored computer program code are configured, with the at least one processor, to cause the apparatus to select the second network interface.

6. An apparatus comprising at least one processor and at least one memory storing computer program code, wherein the at least one memory and stored computer program code are configured, with the at least one processor, to cause the apparatus to at least:
determine a network address family preference policy signaled by an access point for a first network interface, wherein the network address family preference policy signaled to the host apparatus by the access point comprises a default router preference signaled in a router advertisement message signaled to the host apparatus by the access point; and
select an interface from the first network interface and a second network interface for network traffic based at least in part on the signaled preference policy,
wherein in an instance in which network traffic is being transmitted over a transport connection on the first network interface and the second network interface is selected, the at least one memory and stored computer program code are configured, with the at least one processor, to further cause the apparatus to:
determine whether the network traffic being transmitted over the transport connection is configured for a specific route; and
in an instance in which the network traffic being transmitted over the transport connection is determined to be configured for a specific route, determine to not offload the network traffic being transmitted over the transport connection to the second network interface.

7. The apparatus of claim 5, wherein the at least one memory and stored computer program code are configured, with the at least one processor, to cause the apparatus to select an interface for network traffic at least in part by selecting whether to offload network traffic from the first network interface to the second network interface.

8. The apparatus of claim 5, wherein the first network interface comprises a cellular network interface and the second network interface comprises a wireless local area network interface.

9. A computer program product comprising at least one non-transitory computer-readable storage medium having computer-readable program instructions stored therein, the computer-readable program instructions comprising:
program instructions configured to determine, at a host apparatus, a network address family preference policy signaled by an access point for a first network interface, wherein the network address family preference policy signaled to the host apparatus by the access point comprises a default router preference signaled in a router advertisement message signaled to the host apparatus by the access point;
program instructions configured to select an interface from the first network interface and a second network interface for network traffic of the host apparatus based at least in part on the signaled preference policy; and
program instructions configured, in an instance in which network traffic is being transmitted over a transport connection on the first network interface and the second network interface is selected, to:
determine whether the network traffic being transmitted over the transport connection is configured for a specific route; and
in an instance in which the network traffic being transmitted over the transport connection is determined to be configured for a specific route, determine to not offload the network traffic being transmitted over the transport connection to the second network interface.

10. The computer program product of claim 9, wherein the network address family preference policy indicates a level of preference for a first network address family, and wherein the first network address family is by default preferred over a second network address family.

11. The computer program product of claim 9, wherein the program instructions configured to select an interface for network traffic comprise program instructions configured to select whether to offload network traffic from the first network interface to the second network interface.

12. The computer program product of claim 9, wherein the first network interface comprises a cellular network interface and the second network interface comprises a wireless local area network interface.

* * * * *